United States Patent
Gubin et al.

(10) Patent No.: US 9,582,786 B2
(45) Date of Patent: Feb. 28, 2017

(54) NEWS FEED RANKING MODEL BASED ON SOCIAL INFORMATION OF VIEWER

(75) Inventors: Max Gubin, Walnut Creek, CA (US); Wayne Kao, Mountain View, CA (US); David Vickrey, Mountain View, CA (US); Alexey Maykov, Redmond, WA (US)

(73) Assignee: Facebook, Inc., Menlo Park, CA (US)

( * ) Notice: Subject to any disclaimer, the term of this patent is extended or adjusted under 35 U.S.C. 154(b) by 1063 days.

(21) Appl. No.: 13/194,773

(22) Filed: Jul. 29, 2011

(65) Prior Publication Data

US 2013/0031489 A1    Jan. 31, 2013

(51) Int. Cl.
*G06Q 50/00* (2012.01)
*G06Q 10/10* (2012.01)
*G06F 11/34* (2006.01)
*G06F 17/30* (2006.01)
*H04L 29/08* (2006.01)

(52) U.S. Cl.
CPC ............ *G06Q 10/10* (2013.01); *G06Q 50/01* (2013.01); *G06F 11/34* (2013.01); *G06F 17/30867* (2013.01); *H04L 67/22* (2013.01); *H04L 67/306* (2013.01)

(58) Field of Classification Search
CPC ...... G06Q 50/01; G06Q 10/10; G06Q 10/107; H04L 67/22; H04L 67/306; H04L 51/16; G06F 11/34; G06F 17/30867; G06F 3/0484; G06F 17/3089; G06F 17/30876; G06F 17/30864; G06F 17/30716

USPC ..... 715/733, 751, 753; 705/319; 706/12, 46; 709/204, 226
See application file for complete search history.

(56) References Cited

U.S. PATENT DOCUMENTS

| | | |
|---|---|---|
| 8,494,897 B1 | 7/2013 | Dawson |
| 2006/0129935 A1 | 6/2006 | Deinlein et al. |
| 2006/0136292 A1 | 6/2006 | Bhati et al. |
| 2009/0044113 A1 | 2/2009 | Jones et al. |

(Continued)

OTHER PUBLICATIONS

Carlos, S., "Facebook EdgeRank and 3 steps to optimize visibility in the Facebook News Feed (NFO)," *Antezeta*, Feb. 14, 2011, three pages. [Online] [Retrieved Oct. 31, 2013] Retrieved from the Internet <URL:http://antezeta.com/newsfacebook-edgerank-new-feed>.

(Continued)

*Primary Examiner* — Rinna Yi
(74) *Attorney, Agent, or Firm* — Fenwick & West LLP

(57) ABSTRACT

Machine learning models are used for ranking news feed stories presented to users of a social networking system. The social networking system divides its users into different sets, for example, based on demographic characteristics of the users and generates one model for each set of users. The models are periodically retrained. The news feed ranking model may rank news feeds for a user based on information describing other users connected to the user in the social networking system. Information describing other users connected to the user includes interactions of the other users with objects associated with news feed stories. These interactions include commenting on a news feed story, liking a news feed story, or retrieving information, for example, images, videos associated with a news feed story.

24 Claims, 7 Drawing Sheets

(56) References Cited

U.S. PATENT DOCUMENTS

| | | | |
|---|---|---|---|
| 2009/0119167 A1* | 5/2009 | Kendall | G06Q 30/02 705/14.17 |
| 2010/0313009 A1 | 12/2010 | Combet et al. | |
| 2011/0137776 A1 | 6/2011 | Goad et al. | |
| 2011/0313840 A1 | 12/2011 | Mason et al. | |
| 2012/0072428 A1 | 3/2012 | Kao et al. | |
| 2012/0143963 A1* | 6/2012 | Kennberg | G06Q 10/107 709/206 |
| 2012/0150772 A1* | 6/2012 | Paek et al. | 706/12 |
| 2012/0215771 A1* | 8/2012 | Steiner | 707/723 |
| 2012/0266081 A1 | 10/2012 | Kao | |
| 2012/0278166 A1 | 11/2012 | Badros et al. | |
| 2012/0284251 A1* | 11/2012 | Haas | G06F 17/30864 707/709 |
| 2013/0031034 A1 | 1/2013 | Gubin et al. | |
| 2013/0031489 A1 | 1/2013 | Gubin et al. | |
| 2013/0073568 A1 | 3/2013 | Federov et al. | |
| 2013/0173607 A1 | 7/2013 | Wable et al. | |
| 2013/0232156 A1 | 9/2013 | Dunn et al. | |

OTHER PUBLICATIONS

Kincaid, J., "EdgeRank: The Secret Sauce That Makes Facebook's News Feed Tick," TechCrunch.com, Apr. 22, 2010, thirteen pages. [Online] [Retrieved Oct. 30, 2013] Retrieved from the Internet <URL:techcrunch.com/2010/04/22/facebook-edgerank/>.

Paek, T. et al., "Predicting the Importance of Newsfeed Posts and Social Network Friends," *Proceedings of the Twenty-Fourth AAAI Conference on Artificial Intelligence (AAAI-10)*, 2010, pp. 1419-1424.

Krulwich, B., "Lifestyle Finder: Intelligent User Profiling Using Large-Scale Demographic Data," *AI Magazine, American Association for Artificial Intelligence*, 1997, pp. 37-45, vol. 18, No. 2.

* cited by examiner

NEWS FEED RANKING MODEL BASED ON SOCIAL INFORMATION OF VIEWER

BACKGROUND

This invention relates to news feeds in social networking systems and in particular to using machine learning for ranking news feed stories in social networking systems.

A social networking system typically has access to large amount of social information describing actions performed by users that may be of interest to other users of the social networking system. A user is likely to be interested in learning about actions performed by other users connected to the user in the social networking system. These actions include, photo uploads, status updates, transactions, wall posts, posting of comments, recommendations, likes indicated on other users' photos, videos, and the like. The social networking system stores other types of information that is likely to be of interest to a user, for example, activities related to social groups or events represented in the social networking system. The social networking system presents social information as news feed stories, also referred to herein as stories, the news feed, or feed stories.

Since a user may be connected to several other users of the social networking system and may be interested in multiple social groups and events, there can be several stories generated on a regular basis that may be of interest to the user. However, the user may have more interest in certain stories compared to others. Users prefer to see stories that they are more interested in compared to stories that they find less interesting when they interact with the social networking system.

A social networking system that presents interesting stories relevant to each user is more likely to ensure that users are loyal to the social networking system and visit it on a regular basis. Furthermore, users presented with interesting stories are more likely to interact with the social networking system, for example, to comment on the stories or to recommend or like a story. This in turn creates more content which may be of interest to other users. Also, actions performed by other users related to stories created by a user provide encouragement for the user who created the story to post more content. A social networking system that provides information of interest to users and distributes the information to the people that are most interested in the news, attracts more users to the social networking system.

If a social networking system has a large user base that is loyal, businesses are more likely to advertise their products and services on the social networking system. Advertisements from businesses provide revenue to the social networking system. Therefore, the ability of a social networking system to determine relevant stories of interest to its may be tied to the revenue earned by the social networking system. However, determining which stories are of interest to a user can be challenging because a large number of factors may determine whether a user finds a story interesting or not.

SUMMARY

Embodiments of the invention generate machine learning models for ranking news feed stories presented to users of a social networking system. The news feed ranking model ranks news feeds for a user based on information describing other users connected to the user in the social networking system. Information describing other users connected to the user includes interactions of the other users with objects associated with news feed stories. These interactions include commenting on a news feed story, liking a news feed story, or retrieving information, for example, images, videos associated with a news feed story.

In an embodiment, the social networking system trains the news feed ranking model using past interactions of users with news feed stories. The social networking system may represent past interactions of users with news feed stories as tuples, each tuple comprising information identifying a news feed story presented to a viewer, information identifying the viewer, and an interaction of the viewer with the news feed story. The news feed ranking model may use features comprising an aggregate measure of scores describing interactions of the other users with objects associated with the news feed story. The news feed ranking model may use features comprising demographic information of other users connected to the user.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A social networking system uses machine learning models for ranking news feed stories for presentation to a user. The ranks of news feed stories for a user are determined based on a likelihood that the user would find the story interesting. Various features based on user attributes, story attributes, as well social information associated with the users are used to determine how to rank the news feed stories presented to a user. Different machine learning models for ranking news feed stories may be generated for different demographic subsets of users. Each model may be retrained at a different rate to ensure that the model reflects the latest information available in the social networking system that affects the ranking of news feed stories.

System Environment

Figure 1:
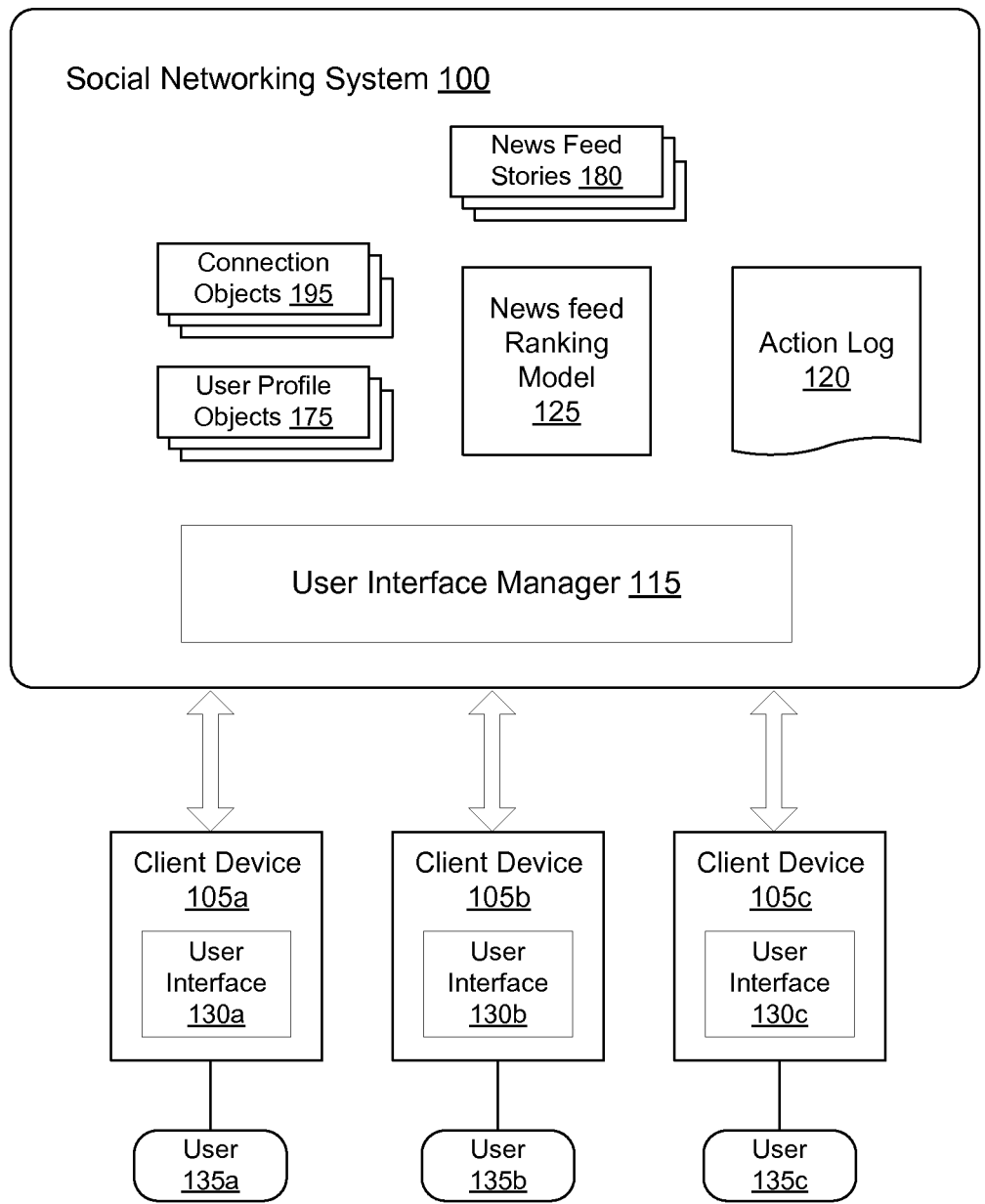
FIG. 1 is a diagram of a system environment for presenting news feed stories to users of a social networking system, in accordance with an embodiment of the invention.

FIG. 1 is a diagram of a system environment for presenting news feed stories to users of a social networking system, in accordance with an embodiment of the invention. The users 135 interact with the social networking system 100 using client devices 105. Some embodiments of the systems 100 and 105 have different and/or other modules than the ones described herein, and the functions can be distributed among the modules in a different manner than described here.

The social networking system 100 offers its users the ability to communicate and interact with other users of the social networking system 100. Users join the social networking system 100 and then add connections to a number of other users of the social networking system 100 to whom they desire to be connected. As used herein, the term "friend" refers to any other user to whom a user has formed a connection, association, or relationship via the social networking system 100. The term friend need not require that users to actually be friends in real life, (which would generally be the case when one of the members is a business or other entity); it simply implies a connection in the social networking system 100.

The social networking system 100 maintains different types of objects representing entities, for example, user profile objects 175, connection objects 195, and objects representing news feed stories 180. An object may be stored for each instance of the associated entity. A user profile object 175 stores information describing a user of the social networking system 100. A connection object 195 stores information describing relations between two users of the social networking system or in general any two entities represented in the social networking system 100. These objects are further described in detail herein.

Figure 2:
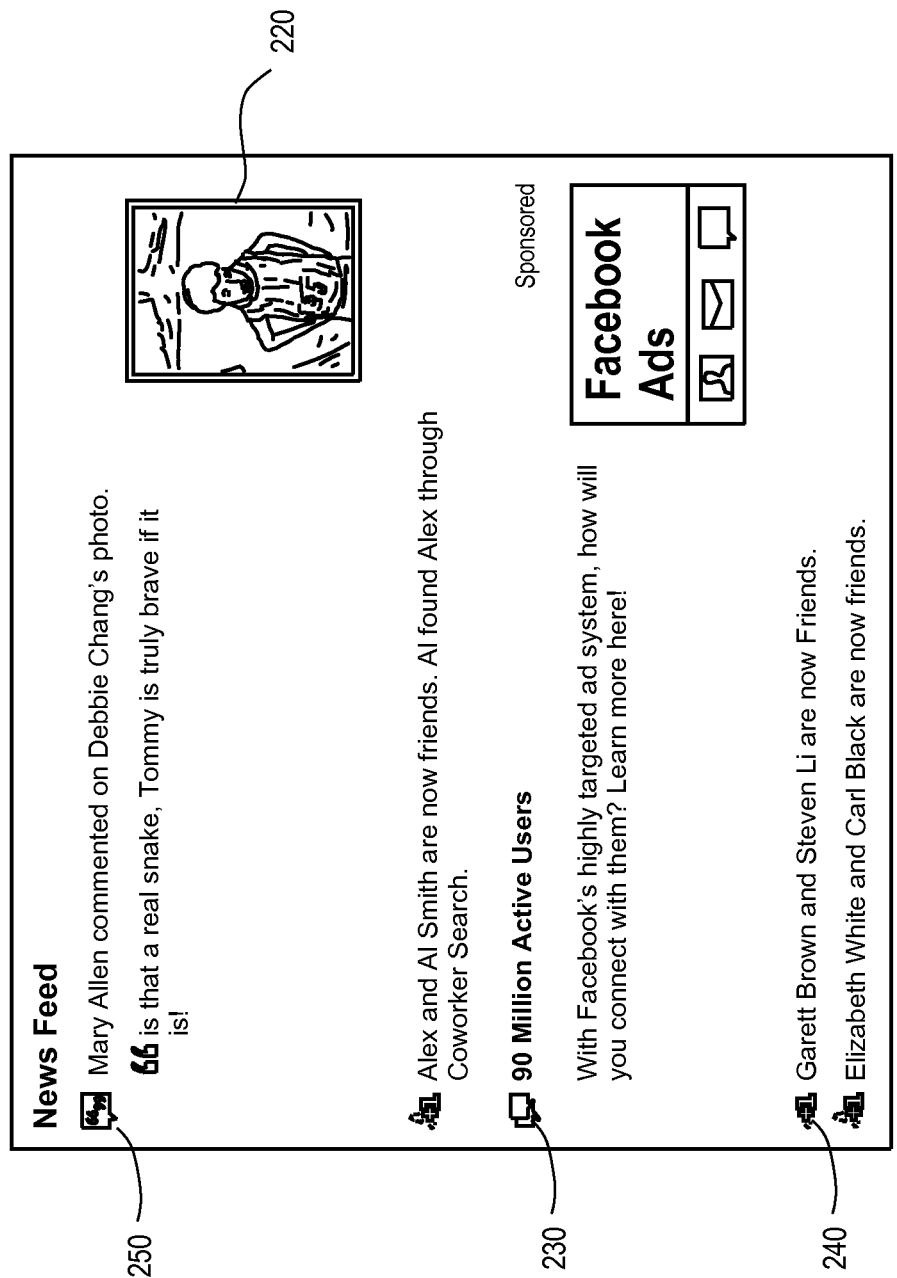
FIG. 2 shows a screenshot of a user interface displaying news feed stories presented to a user, in accordance with one embodiment of the invention.

The social networking system 100 comprises a user interface manager 115 and various modules described in FIG. 2. The user interface manager 115 allows users of the social networking system 100 to interact with the social networking system 100 via the user interface 130. The user interface manager 115 presents social information of interest to a user including news feed stories 180. The news feed ranking model 125 ranks the news feed stories 180 of interest to each user 135 and presents them in order of the ranking In an embodiment, the news feed ranking model 125 is a machine learning model.

The client device 105 used by a user 135 for interacting with the social networking system 100 can be a personal computer (PC), a desktop computer, a laptop computer, a notebook, a tablet PC executing an operating system, for example, a Microsoft Windows-compatible operating system (OS), Apple OS X, and/or a Linux distribution. In another embodiment, the client device 105 can be any device having computer functionality, such as a personal digital assistant (PDA), mobile telephone, smartphone, etc.

FIG. 1 and the other figures use like reference numerals to identify like elements. A letter after a reference numeral, such as "130A," indicates that the text refers specifically to the element having that particular reference numeral. A reference numeral in the text without a following letter, such as "130," refers to any or all of the elements in the figures bearing that reference numeral (e.g. "130" in the text refers to reference numerals "130A" and/or "130B" in the figures).

The client device 105 executes a user interface 130 to allow the user 135 to interact with the social networking system 100. The user interface 130 allows the user to perform various actions associated with the social networking system 100 and view information provided by the social networking system 100. The actions performed using the user interface 130 include adding connections, posting messages, uploading images or videos, updating the user's profile, and the like. The information provided by the social networking system 100 that can be viewed using the user interface 130 includes, images or videos posted by the user's connections, comments posted by the user's connections, messages sent to the user by other users, or wall posts. In an embodiment, the user interface 130 is presented to the user via a browser application that allows a user to retrieve and present information from the internet or from a private network.

FIG. 2 shows a screenshot of a user interface displaying news feed stories presented to a user, in accordance with one embodiment of the invention. As shown in FIG. 2 news feed stories 250 from a user's connection are presented to the user. Typically, the news feed stories presented to the user are updated as and when new news feed stories are generated. New news feed stories can be generated when connections of the user perform actions. For example, a connection may post an image 220 and a user may post a comment associated with the image posted. Both, the activities of posting the image as well as commenting on the image can generate news feed stories 250. Other news feed stories 240 include activities, for example, a connection of the user adding a new connection.

Some news feed stories 230 may be based on information that is not associated with a specific action performed by a user but may be relevant to multiple users of the social networking system. For example, information 230 describing a new feature offered by the social networking system 100 may be determined to be of interest to all users and sent to them as a news feed story. Some features added to the social networking system may be determined to be of interest only to a set of users. For example, a news feed story reporting a new game added to the social networking system 100 may be presented to users that have indicated interest in similar games. Similarly, news feed stories associated with entities represented in the social networking system including events or social groups may be reported to multiple users that are determined to be interested in the entity.

Social Networking System Architecture

Figure 3:
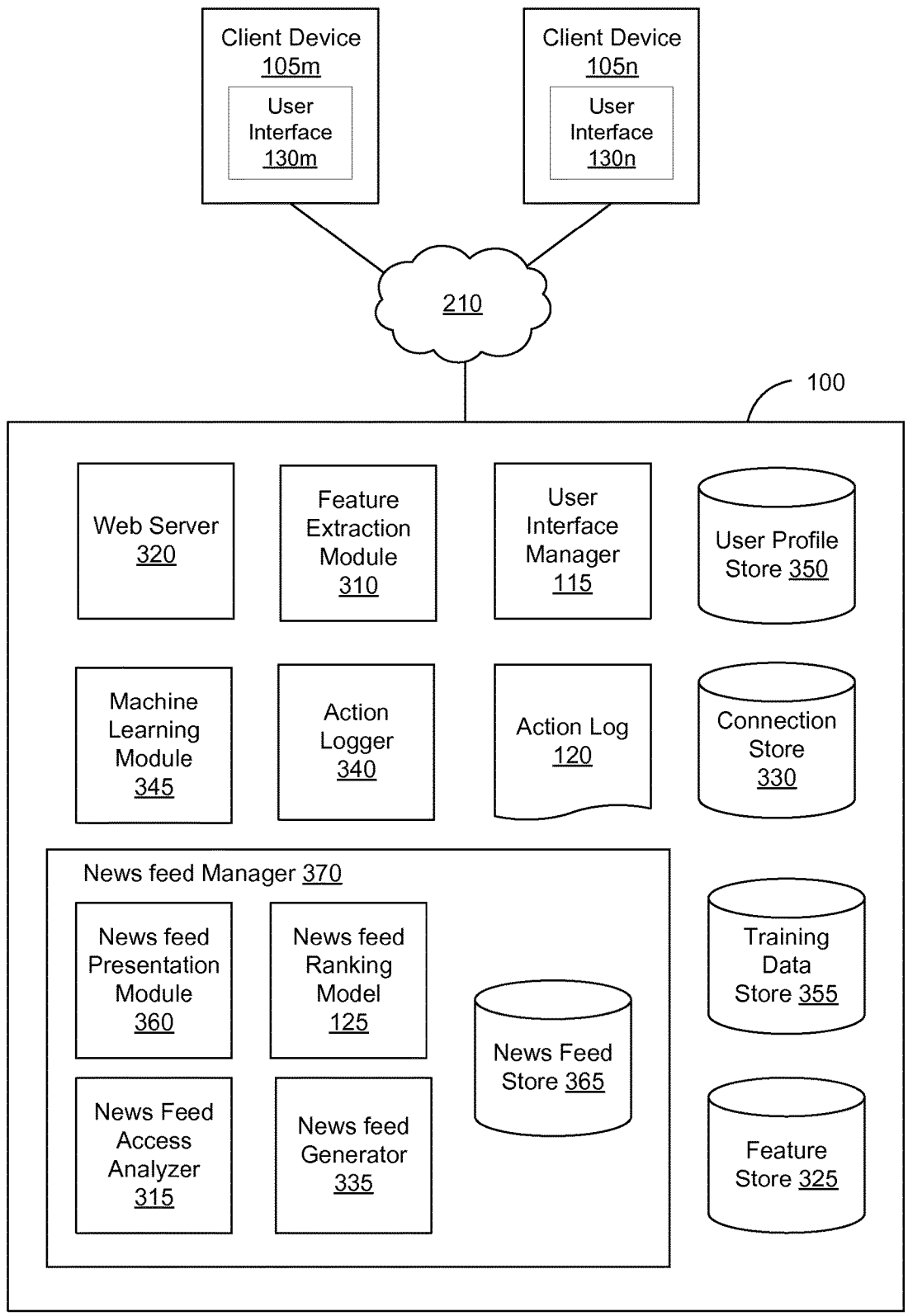
FIG. 3 is a diagram of the system architecture of a social networking system for ranking news feed stories presented to users, in accordance with an embodiment of the invention.

FIG. 3 is a diagram of system architecture of a social networking system 100 for ranking news feed stories presented to users, in accordance with an embodiment of the invention. The social networking system 100 includes a web server 320, a news feed manager 370, a user interface manager 115, an action logger 340, an action log 120, a user profile store 350, a connection store 330, a machine learning module 345, a feature store 325, a training data store 355, and a feature extraction module 310. In other embodiments, the social networking system 100 may include additional, fewer, or different modules for various applications. Conventional components such as network interfaces, security mechanisms, load balancers, failover servers, management and network operations consoles, and the like are not shown so as to not obscure the details of the system.

The social networking system 100 allows users to communicate or otherwise interact with each other and access content. The social networking system 100 stores user profile objects 175 in the user profile store 350. The information stored in user profile store 350 describes the users of the social networking system 100, including biographic, demographic, and other types of descriptive information, such as age, work experience, educational history, interests, gender, sexual preferences, hobbies or preferences, location, income, languages spoken, ethnic background, and the like. Information describing a user may be explicitly provided by a user or may be inferred from actions of the user. For example, interests of a user can be inferred from the type of content accessed by the user. The user profile store 350 may store other types of information provided by the user, for example, images, videos, documents, likes indicated by the user, comments, status updates, recommendations of images, videos, or uniform resource locator (URL) links, and the likes. Images of users may be tagged with the identification information of the appropriate users displayed in an image.

The connection store 330 stores data describing the connections between different users of the social networking system 100, for example, as represented in a connection object 195. The connections are defined by users, allowing users to specify their relationships with other users. For example, the connections allow users to generate relationships with other users that parallel the users' real-life relationships, such as friends, co-workers, partners, and so forth. In some embodiment, the connection specifies a connection type based on the type of relationship, for example, family, or friend, or colleague. Users may select from predefined types of connections, or define their own connection types as needed.

Connections may be added explicitly by a user, for example, the user selecting a particular other user to be a friend, or automatically created by the social networking system 100 based on common characteristics of the users (e.g., users who are alumni of the same educational institution). Connections in social networking system 100 are usually in both directions, but need not be, so the terms "connection" and "friend" depend on the frame of reference. For example, if Bob and Joe are both connected to each other in the social networking system 100, Bob and Joe, both users, are also each other's friends. The connection between users may be a direct connection; however, some embodiments of a social networking system 100 allow the connection to be indirect via one or more levels of connections. Connections may also be established between different types of entities for example, the social networking system 100 can have an object representing a school and users of the social networking system 100 that study in the school or who are alumni of the school can connect with the school in the social networking system 100.

The web server 320 links the social networking system 100 via the network 210 to one or more client devices 105; the web server 320 serves web pages, as well as other web-related content, such as Flash, XML, and so forth. The web server 320 provides the functionality of receiving and routing messages between the social networking system 100 and the client devices 105 as well as other external systems. These messages can be instant messages, queued messages (e.g., email), text and SMS (short message service) messages, or any other suitable messaging technique. In some embodiments, a message sent by a user to another can be viewed by other users of the social networking system 100, for example, by the connections of the user receiving the message. An example of a type of message that can be viewed by other users of the social networking system 100 besides the recipient of the message is a wall post.

The action logger 340 is capable of receiving communications from the web server 320 about user actions on and/or off the social networking system 100. The action logger 340 populates the action log 120 with information about user actions to track them. When a user performs an action using the social networking system 100, action logger 340 adds an entry for that action to the action log 120. Any action that a particular user takes with respect to another user is associated with each user's profile, through information maintained in a database or other data repository, such as the action log 120. Such actions may include, for example, adding a connection to the other user, sending a message to the other user, reading a message from the other user, viewing content associated with the other user, attending an event posted by another user, among others. In addition, a number of actions described below in connection with other objects are directed at particular users, so these actions are associated with those users as well.

The news feed manager 370 provides the functionality for managing activities related to news feed including, generating the news feed stories, selecting the news feed stories for presentation to users of the social networking system 100, ranking the news feed stories identified for presentation to a user, and presenting the news feed stories via the user interface manager 115. The news feed manager 370 comprises a newsfeed generator 335, a news feed ranking model 125, news feed access analyzer 315, news feed presentation module 360, and a news feed store 365. A news feed story may describe objects represented in the social networking system, for example, an image, a video, a comment from a user, status messages, external links, content generated by the social networking system, applications, games, or user profile.

The news feed generator 335 module generates news feed stories for presentation to users of the social networking system 100. The user to whom a news feed story is presented is referred to as a viewer of the news feed story. In an embodiment, the news feed generator 335 analyzes information stored in the action log 120 to identify information useful for generating news feed stories. The news feed generator 335 identifies actions stored in action log 120 that are likely to be of interest to viewers and extracts information describing these actions from the action log 120 to generate news feed stories 180. Alternatively, the news feed generator 335 can obtain information describing actions from other modules, for example, from the action logger 340, the user interface manager 115, or other run time modules that implement functionality for performing different types of actions. For example, if a user uploads an image to the social networking system 100, the module executing the code for uploading the image can inform the news feed generator 335 of the action so that the news feed generator 335 can generate a news feed story describing the action.

The news feed generator 335 may determine that certain actions are not likely to be of interest to users for reporting as news feed stories 180. For example, a user hiding a comment posted by another user or a user changing certain types of user preferences may not be of interest to other users and is therefore not reported in news feed stories. However, other changes made by a user to the user's profile may be considered interesting for other users, for example, a change in relationship status of a user.

The news feed generator 335 may not generate news feed stories based on certain actions as a matter of policies enforced by the social networking system 100. For example, a user viewing user profile of another user or a user sending a private message to another user may not be presented as news feed stories due to privacy concerns. Furthermore, the news feed generator 335 may consider privacy settings of individual users to determine whether certain actions of a user can be presented as news feed stories to other users. A user may set the user's privacy settings to limit the set of people to whom news feed stories describing the user's actions may be sent. For example, a user may allow only connections of the user to receive information describing the users' actions, whereas another user may allow connections of the user's connections to receive the information. A user may restrict the types of actions that are reported as news feed stories. For example, the user may specify that certain actions, for example, adding a new connection may not be reported as news feed stories.

In an embodiment, the news feed generator 335 stores the news feed stories 180 generated in the news feed store 365. The news feed store 365 may be represented as a database that links various objects related to the news feed stories 180. Each news feed story 180 stored in the news feed store 365 can be associated with other entities in the social networking system 100. For example, a news feed story 180 may be associated with one or more users that performed an action described in the news feed story 180 as well as with a representation of the video in the social networking system 100. The users that performed the actions described in the news feed story are called the actors. For example, if the news feed story describes a comment posted by John on a video posted by Jack, both John and Jack can be considered actors of the news feed story. As another example, a news feed story 180 describing a comment posted by a user in response to another user's wall post may be associated with both the user who posted the message on the wall and the user who posted the comment.

The news feed presentation module 360, determines the news feed stories to be presented to a user and provides the stories selected for presentation to the user interface manager 115. The user interface manager 115 presents the selected news feed stories to the user interface 130 on a client device 105. The news feed presentation module 360 determines a set of stories for presentation to a viewer based on associations between the stories and the viewer. These associations are determined on various factors including, whether the story describes a user of the social networking system that is connected to the user, whether the viewer previously accessed information describing an entity represented in the social networking system that is described in the story, whether the viewer interacted with another story that is related to the current story, and the like. The news feed presentation module 360 invokes the news feed ranking model 125 to rank the news feed stories being presented to the user. The news feed presentation module 360 may present a subset of the stories based on the rank, for example, the top 10 stories, depending on the display area available on the user interface 130 for presenting the stories. The news feed presentation module 360 presents the stories in the order determined by the ranking, for example, stories ranked higher may be presented more prominently compared to stories ranked lower. In an embodiment, the stories ranked higher are presented above the stories ranked lower. In other embodiments, stories ranked higher may be presented more prominently by displaying them using an appropriate text color, font, text size, back ground color, etc.

The machine learning module 345 uses machine learning techniques to generate the news feed ranking model 125. In an embodiment, the machine learning module 345 may generate a portion of the functionality invoked by the news feed ranking model 125. For example, the machine learning module 345 may generate a model that determines a ranking score associated with a given news feed story 180. The news feed ranking model 125 can order a set of news feed stories based on their ranking scores.

The machine learning module 345 may generate a model based on optimization of different types of ranking models, including but not limited to algorithms that analyze every story separately, pairs of stories, or sets of stories. For example, the machine learning module 345 may generate a classifier that takes as input a pair of news feed stories for a given user and returns true if the first news feed story ranks higher than the second news feed story for reporting to the user and false otherwise. The news feed ranking model 125 can use the output of the generated classifier to rank a given set of news feed stories by doing pair wise comparisons of the ranking scores of the stories. Other embodiments can use other machine learning techniques for ranking news feed stories, for example, tree-based models, kernel methods, neural networks, splines, or an ensemble of one or more of these techniques.

In some embodiments the social networking system 100 may use multiple news feed ranking models 125 for ranking news feed stories for users. For example, the machine learning module 345 may divide the set of users of the social networking system 100 into different subsets of users and generate one news feed ranking model for each subset of user. The subsets of users may be determined based on demographic information describing the users, for example, age, gender, languages spoken, ethnic background, etc. Since different sets of users may have different characteristics determining their interests in news feed stories, a news feed ranking model 125 for each set of user is likely to provide more accurate ranking compared to a single news feed ranking model for the entire set of users.

In an embodiment, the features used by the model for each set of users are determined based on the set. For example, if the set of users is characterized by income, features that are affected by the income of the user or features that affect the income of the user are used for the model. These may include profession of the user, education of the user, location of the user and the like. Similarly, if a set of the user is characterized by language, features based on ethnicity and location of the user may be used for the model since a language spoken by a user may depend of the ethnicity and location.

In an embodiment, the features used for a model for a set may depend on the value of the attribute that characterizes the set. For example, if age is used as an attribute that characterizes the set, different sets may be determined for users in a teenage group, users in middle age group, and users in senior age group. The features used for the model for each set corresponding to an age group may depend on the value (or range of values) of the age for the set. For example, the model for a set of senior may use features appropriate for seniors whereas a model for a set of teenagers may use features appropriate for teenagers.

Other embodiments determine sets of the users based on information describing connections of the users of the set. An example of information describing connections of the users is the total number of connections of the user or the total number of connections of the user that have more than a threshold level of affinity with the user. Sets may be characterized based on attributes of the connections for example, demographic information describing the connections of the users. Examples of demographic information of connections of users include the distribution of age, language, income, ethnicity, location, etc. of the connections of the user. An aggregate measure of the attributes of the connections may be used as the attribute value that is representative of the connections of the user. For example, if more than a threshold percent of connections of the user speak a particular language, that language may be considered a representative language for the connections of the user. Similarly, a statistical measure, for example, mean, mode, or median of income (or age) of the connections may be used as a representative income (or age) of the connections of the user. Accordingly, these attributes that are representative of the connections of the user can be used to characterize sets of users for training models for ranking news feed.

Other factors used for characterizing sets of users include how long a user has been interacting with the social networking system, for example, the time since the user became a member of the social networking system. Sets of users may be characterized based on how frequently a user interacts with the social networking system, for example, a set may represent users that interact very frequently with the social networking system such that a rate at which the users of the set interacts exceeds a threshold level, whereas another set may represent users that interact rarely with the social networking system.

The machine learning module 345 uses training data sets for training the news feed ranking models 150. The training data store 355 stores training data sets comprising tuples of news feed stories 180, users of the social networking system, and information indicating their interaction with the news feed stories. The stories and users can be identified in a tuple stored in the training data store using identifiers that uniquely identify the stories and the users respectively. The information indicating the interaction of a user and a news feed story 180 can indicate whether the user interacted with the story or not. A user may interact with a story, for example, by retrieving further information related to the story, for example, by clicking on a URL mentioned in the story or by watching a video or an image associated with the story. On the other hand a user may ignore the story indicating that the user lacks interest in the story.

The information indicating the interaction of a user and a news feed story 180 can include the type of the interaction between the user and the news feed story. Examples of interactions of users with a news feed story include, commenting on the story, liking the story, or retrieving further information associated with the story, watching a video associated with a news feed story, or clicking on a URL link provided in the story. A user interaction with a story can also indicate that the user dislikes the story. For example a user may hide the story thereby providing a negative feedback towards the story. Alternatively, the user may post a comment on the story with negative sentiments regarding the story. The information indicating the interaction of a user and a news feed story 180 may include the number of times that the user interacted with the story and the different types of interactions.

The feature extraction module 310 extracts various features of the users of the social networking system 100 and features of the news feed stories that are used as input for the news feed ranking model 125. These features characterize the users and the news feed stories respectively. The feature extraction module 310 stores the extracted features in the feature store 325. The feature extraction module 310 may run in a batch mode to process data stored in action log 120, user profile store 350, and connection store 330. The news feed ranking model 125 can extract information from the feature store 325 to rank news feed stories for presentation to users. Alternatively, the feature extraction module 310 may extract the features on a need basis upon invocation by the news feed ranking model 125. This ensures that the news feed ranking model 125 is provided with the recent most information. The feature extraction module 310 however stores the extracted features in the feature store 325 to ensure that the effort of extracting the features is not duplicated. For example, the feature extraction module 310 may store a time stamp along with the features to determine when the information was generated and whether it needs to be regenerated or not.

The news feed access analyzer module 315 analyzes various interactions of the users with the news feed stories to determine rates at which different types of users perform different types of interactions with the certain types of stories. The news feed access analyzer module 315 may divide news feed stories into different subsets based on their characteristics. For example, certain news feed stories may include an image or video and other stories may include a URL link. Some news feed stories may be describe comments posted by users on images or videos, some stories may describe likes indicated by users, and some stories may describe connections added by users. Stories may also be characterized by keywords present in the story or sentiment of the story determined by lexical analysis of the story. Subsets of users may be determined based on their demographic characteristics. The news feed access analyzer module 315 can determine if there is a significant change in the access pattern of a subset of users with respect to a certain type of news feed stories or with respect to all news feed stories. For example, the availability in the market of a type of smartphone that is popular among certain groups of users may cause a sudden increase in the rate at which users of this group access news feed stories comprising images. The news feed access analyzer module 315 analyzes these access patterns of various subsets of users with respect to different types of interactions to determine whether there is more than a threshold change in the access rate compared to an expected access rate. If there is more than a threshold change in the access rate compared to an expected access rate, the news feed access analyzer module 315 may indicate to the machine learning module 345 to retrain the news feed ranking model 125 for the corresponding group of users.

In some embodiments, the system 100 is not a social networking system but a system that communicates with a social networking system to obtain the necessary social network information. The system 100 may communicate with the social networking system, for example, using APIs provided by the social networking system. In these embodiments, some modules shown in FIG. 3 may run in the system 100, whereas other modules may run in the remote social networking system. For example, the modules including the news feed presentation module 360 may run in the system 100 but modules user profile store 350, connection store 330, and action log 120 may exist in a separate social networking system.

The interactions between the client devices 105 and the social networking system 100 are typically performed via a network 210, for example, via the internet. The network 210 enables communications between the client device 105 and the social networking system 100. In one embodiment, the network 210 uses standard communications technologies and/or protocols. The data exchanged over the network 210 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 210 can also include links to other networks such as the Internet.

Generating and Using a News Feed Ranking Model

Figure 4:
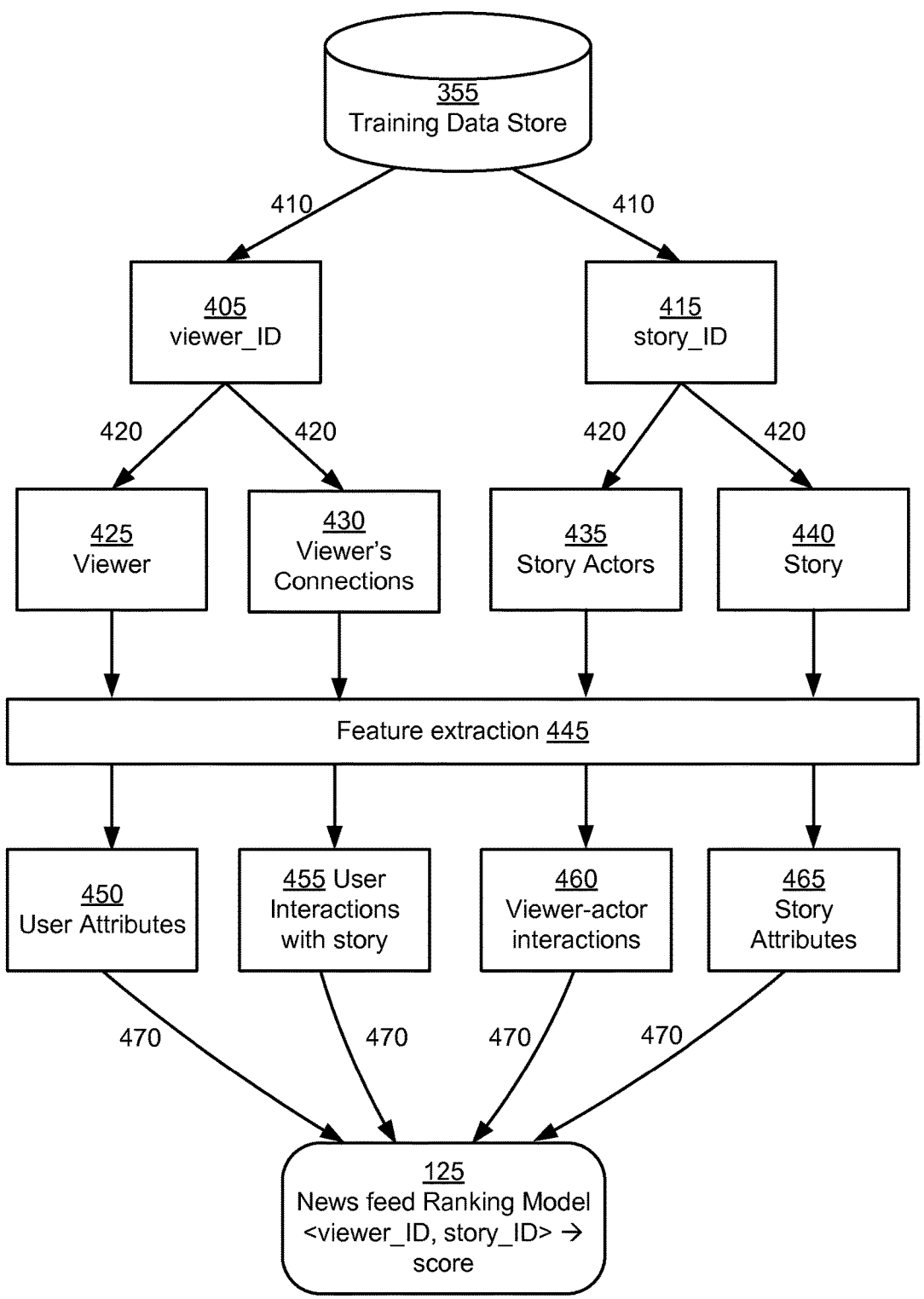
FIG. 4 shows a data flow diagram illustrating the interactions between various types of data stored in a social networking system for training a model for ranking news feed stories, according to one embodiment of the invention.

FIG. 4 shows a data flow diagram illustrating the interactions between various types of data stored in a social networking system for training a model for ranking news feed stories, according to one embodiment of the invention. The machine learning module 345 trains the news feed ranking model 125 based on data stored in the training data store 355. The information used for training the model 125 comprises information describing the viewers of a story and information describing stories. The machine learning module 345 retrieves 410 information identifying viewers (referred to as viewer_ID 405), information identifying stories (referred to as story_ID 415) from the training data store 355 as well as information indicating the type of interaction between the viewer identified by viewer_ID 405 and the story identified by story_ID 415. The information indicating the type of interaction between the viewer and the story may indicate whether the viewer interaction with the story indicated a positive feedback indicating the viewer liked the story or negative feedback indicating viewer did not like the story. For example, certain interactions indicate that the viewer is interested in the story, for example, when the viewer attempts to retrieve additional information about the story, comments on the story, or likes the story. On the other hand, certain interactions indicate that the viewer is not interested in the story, for example, if a viewer does not interact with a story when presented with the story, or hides or removes the story.

The machine learning module 345 retrieves 420 social networking objects describing entities associated with the viewer_ID 405 and story_ID 415. For example, the machine learning module 345 may retrieve 420 an object representing a viewer 425 identified by the viewer_ID 405 and an object representing a story 440 identified by the story ID 415. The machine learning module 345 may retrieve 420 other objects representing entities in the social networking system 100 that are associated with the viewer 425 and the story 440. For example, the machine learning module 345 may retrieve 420 connections 430 of the viewer and actors 435 associated with the story 440. The machine learning module 345 may retrieve other objects representing entities, not shown in FIG. 4, for example, objects representing an image, video, event, or a social group associated with the story 440.

The machine learning module 345 invokes the feature extraction module 310 to extract 445 features from the objects representing various entities associated with the viewer 425 and the story 440. The machine learning module 345 may retrieve the features from the feature store 325 if the features have been previously extracted by the feature extraction module 310 and stored in the feature store 325. The features extracted 445 may be associated with individual objects or with interactions between objects. As shown in FIG. 4, the features extracted 445 include features based on user attributes 450, features based on user interactions with stories 455, features based on viewer-action interactions 460, and feature based on story attributes 465. The machine learning module 345 trains 470 the model 125 based on the extracted 445 features. The training data store 355 is populated with examples of data corresponding to various types of interactions between the users and the stories with different values of the features. The different types of features used by the machine learning module 345 for training the model 125 are described in detail herein. In an embodiment, the model 125 generates a score for ranking a story for a viewer identified by viewer_ID 405 when presented with a story identified by story_ID 415. The model 125 generates the score based on attributes of the identified by viewer_ID 405 and attributes of the story identified by story_ID 415.

Figure 5:
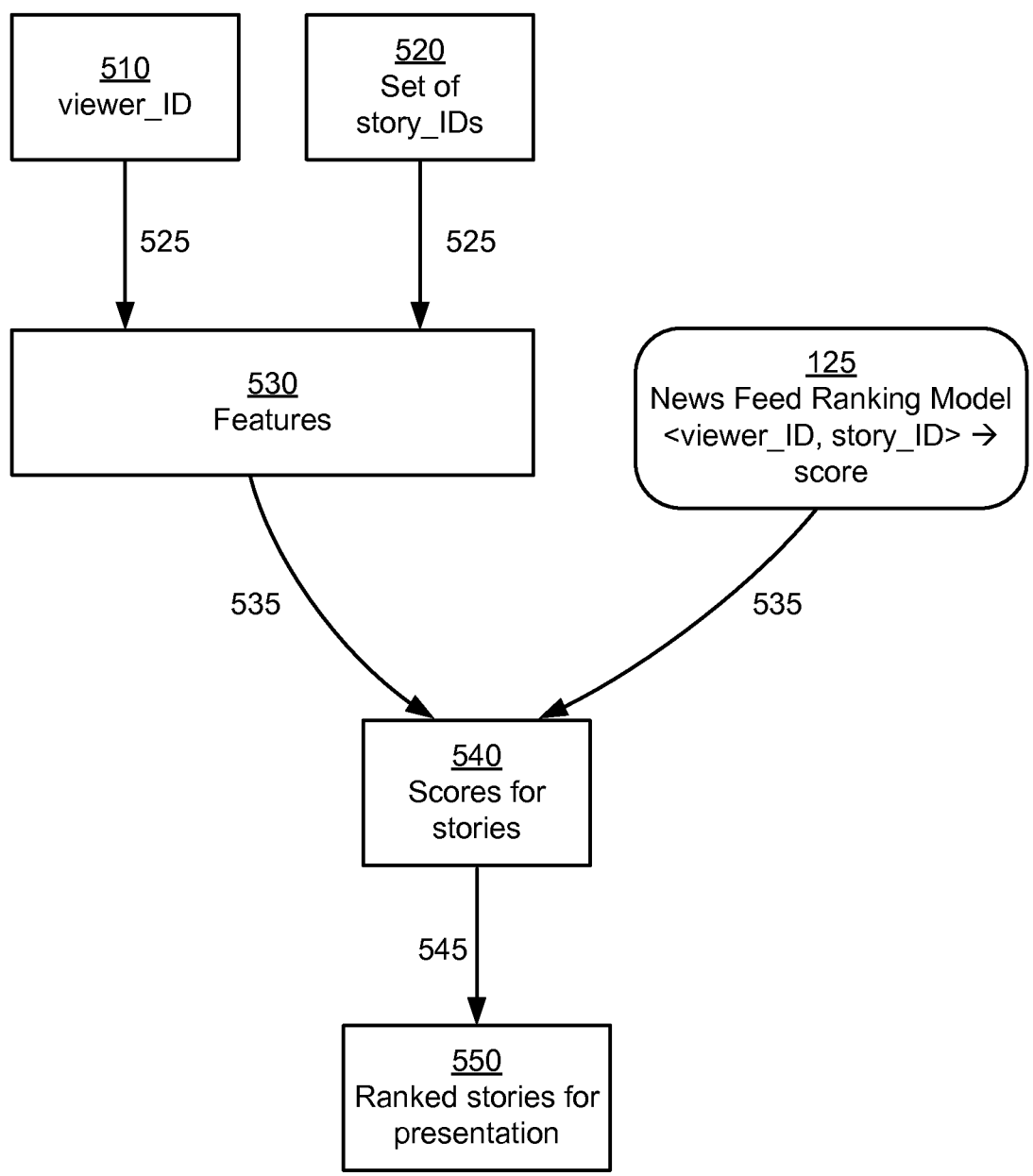
FIG. 5 shows a data flow diagram illustrating how to rank news feed stories presented to a user based on a machine learning model, according to one embodiment of the invention.

FIG. 5 shows a data flow diagram illustrating the interactions between various types of data stored in a social networking system for ranking news feed stories presented to a user, according to one embodiment of the invention. As shown in FIG. 5, the model 125 trained 470 by the machine learning module 345 is used to rank the news feed stories presented to a user. The news feed story presentation module 360 determines a set of stories identified by their story_IDs 520 for presentation to a viewer identified by the viewer_ID 510. If the features 530 of the viewer and the stories were previously extracted and stored in the feature store 325, the news feed story presentation module 360 retrieves 525 the stored features 530. If the features 530 were not previously extracted, the feature extraction module 310 may extract the features and store them in the feature store 325 to allow the news feed story presentation module 360 to retrieve 525 the stories. In some embodiments, the news feed presentation model 360 may rearrange the stories ranked by the news feed ranking model 125 or add/remove some stories. For example, if the news feed ranking model 125 ranks too many stories of the same type very high, the news feed presentation model 360 may remove some of the stories of this particular type and add stories of other types even though they are not ranked so high. For example, based on the ranking provided by the news feed ranking model 125, if all the stories selected describe applications, the news feed presentation model 360 may remove some of these stories and add stories of other kinds for example, news feed describing status updates or events.

The news feed story presentation module 360 invokes 535 the news feed ranking model 125 using the extracted features 530. The news feed ranking model 125 provides the scores 540 for each story in the set of stories selected for presentation to the viewer. The news feed story presentation module 360 ranks 545 the stories based on their scores 540 and obtains a set 550 of ranked stories for presentation. The news feed story presentation module 360 provides the ranked set of stories to the user interface manager 115 for presentation to the user via the user interface 130.

In an embodiment, the features of the news feed story and the user are input to a software module that may not be a machine learning module for ranking the stories. For example, the module can comprise a function that determines a score for a news feed story for a given user based on the features of the news feed story and the user. The score associated with a news feed story can be determined as an aggregate value based on individual scores associated with the features. An example of an aggregate value is a weighted average of a set of values. The module ranks a set of stories identified for presentation to the user based on their score values.

Features for Ranking News Feed Stories

The feature extraction module 310 extracts various features associated with viewers and stories. The features extracted by the feature extraction module 310 can be used for training a news feed ranking model 125 and for using the news feed ranking model 125 for ranking news feed stories for presentation to a user of the social networking system 100. FIG. 4 shows features based on user attributes 450, user interactions with stories, 455, viewer-actor interactions 460, and story attributes 465. A user can be a viewer of the story, an actor associated with the story, a connection of the viewer, or a connection of an actor. A feature of a user can include attributes describing the user as well as social information describing the user. Social information describing a user includes information describing the connections of the user including interactions of the connections with the social networking system, for example, actions performed by the connections using the social networking system. These actions include communicating with other users, retrieving information from the social networking system, or providing information to the social networking system. Examples of information retrieved from the social networking system or provided to a social networking system include images, videos, comments, messages, recommendations to other users and the like.

Features based on story attributes 465 include whether the news feed story is associated with certain media, for example, an image or video, whether the story has a URL link, and keywords in the text of the story. Features based on story attributes 465 also include information describing social network objects related to the story, for example, if the story describes a comment, the feature may describe the type of entity that is the subject of the comment including an image, video, event, or a document. Features based on story attributes 465 include historical information associated with the story available in the social networking system 100. These include age of the story, age of last update associated with the story, for example, the time when a user posted a comment or liked the story.

Examples of features based on user interactions 455 with the story include historical information describing the story, for example, past interactions between viewers and the story, the rate at which viewers interact with the story, the types of interaction between viewers and the story, the types of users that accessed the story, information describing the user that performed an update to the story and so on. If a story is typically accessed by viewers with particular profile characteristics, a target viewer that matches the particular profile characteristics is more likely to be interested in the story compared to other users. For example, a story about a comment posted by a particular celebrity may be typically accessed by male teenage users. A recipient of this news feed story is more likely to be interested in the news feed story if the recipient is a male teenager. Other features based on applications include how long the application has been available in the social networking system, whether the viewer has installed the application, and credibility or reputation of the creator of the application in the social networking system, for example, based on feedback regarding the creator, success of past applications by the creator, and the like.

Certain stories describe applications, for example, applications that run on the social networking system that are build using a platform provided to users for building and executing applications. Features of these stories comprise information describing the platform application described in the story, for example, the applications reputation in the social networking system based on feedback provided by the users of the social networking system. Feedback provided on an application comprises positive and negative feedback including likes and dislikes expressed by the users, ratings provided by the users, comments regarding the application, and numbers of users that installed and use the application. Other features of the application include the type of application, for example, productivity application, games, business related applications, etc.

Features based on user attributes 450 include demographic information of the users including age, income, gender, languages spoken, education, religion, and location. Other features of a user include behavioral information describing the user, for example, how often the user checks news feed, the types of news feed stories the user is interested in, or the types of events of social groups a user shows interest in.

Features based on user attributes 450 can include social information, including information describing the connections of the user, the number of connections of the user, distribution of the age, gender, and other demographic features of the connections of the user and so on. Features describing social information of a user includes past interactions of the connections of the user with the news feed story and with objects associated with the news feed story. Objects associated with a news feed story include entities represented in the social networking system, for example, an image or video described in the news feed story, the user profile of an actor described in the news feed story, an event or social group associated with the story and so on.

In an embodiment, the features describing social information of a user comprise an aggregate measure of scores describing interactions of the connections of the user with objects associated with the news feed story, interactions of the connections with the news feed story, or interactions of the connections with other news feed stories similar to the news feed story. In an embodiment, the aggregate measure weighs interactions by the connections of a viewer based on their affinity with the viewer. For example, interactions of users that are closely connected to the viewer are weighted higher than interactions of connections with whom the viewer rarely interacts. The viewer is more likely to be influenced by connections that are close to the user or connections whose interests closely match the interests of the viewer.

In one embodiment, a connection of the user may be is weighted high based on social information of the connection. Therefore, although the interactions between the user and the connection are indicative of low affinity between the user and the connection, the social information of the connection may indicate high affinity between the user and the connection. For example, if a user has recently created a connection with another user of the social networking system there may not be enough interactions between the user and the connection to meaningfully determine an affinity between the user and the connection based on the interactions. However if there is a significant overlap between the connections of the user and the connections of the connection, this particular connection may be weighted high for purposes of ranking feeds for the user. The social networking system may determine that there is significant overlap between the connections of two users if the number of connections of the two users that are common exceeds a threshold value or a threshold fraction of the number of connections of the users. Similarly, another user may not even be connected to this user but the two users may be determined as having an association due to overlap of their connections. Accordingly, the other user may be treated similar to a connection of the user and weighted high for purposes of ranking newsfeed for the user.

In an embodiment, information describing interactions of connections of a user comprises aggregate values based on interactions. For example, a feature may comprise an average number of times each connection of a user performed certain type of interaction with objects associated with a news feed story. The feature may aggregate interactions of connections of the user with interactions of the user. The news feed ranking model 125 may weigh information describing the connections of a user more that information describing the user if the amount of information describing the user is below a threshold. For example, if a user recently joined the social networking system 100 or interacts with the social networking system rarely, the social networking system 100 may not have sufficient information about the user based on his past interactions. In this case, the information describing the viewer's connections is weighed more compared to another viewer for whom significant information is available in the social networking system.

In an embodiment, two news feed ranking models are generated, a first model that is substantially based on interactions of connections of the user with objects associated with the news feed story and a second model substantially based on interactions of the user with objects associated with the news feed story. If the amount of past interactions of a given user are determined to be below a threshold value, the first model is used to rank news feed stories for the user, otherwise the second model is used to rank news feed stories for the user.

Interactions of a user associated with a news feed story or with objects associated with a news feed story can be classified as positive interactions or negative interactions. A positive interaction indicates that the user is interested in the story. Negative interactions show a lack of interest or disinterest on the part of a user towards a story. Examples of positive interactions include requests for more information related to a story, for example, request to retrieve an image or video, or request to access a URL link in the story. Other examples of positive interactions include liking a news feed story or an object associated with the news feed story, commenting on the news feed story or an object associated with the news feed story, or recommending the news feed story. Examples of negative interactions of a user include request to hide the news feed story, request to delete the news feed story, or ignoring the story by not performing any action with the story or objects associated with the story.

Features based on viewer-actor interactions 460 include types of connections between the viewers and actors, affinity between a viewer and an actor, frequency of interactions between viewers and actors, age of last known interaction between a viewer and an actor and so on. For example, certain viewers may be mostly interested in stories associated with close friends and family, whereas other viewers may be uniformly interested in stories for all connections. Features may be based on interactions between a user or connections of the user with a related story. For example, a user is likely to be interested in a story if a connection of the user posted a comment on that story or liked the story.

Training Models for Different Demographic Subsets of Users

Figure 6:
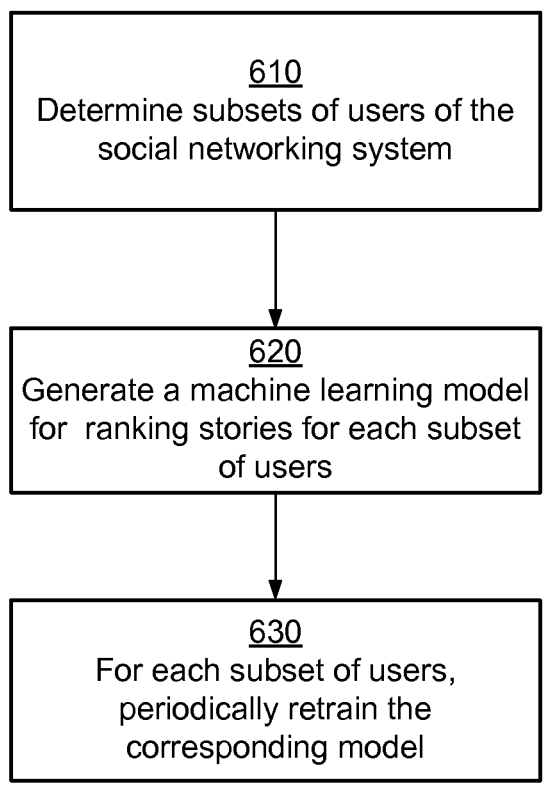
FIG. 6 is a flowchart of the process of training machine learning models for ranking newsfeed for demographic subsets of users, in accordance with one embodiment of the invention.

FIG. 6 is a flowchart of the process of training machine learning models for ranking newsfeed for demographic subsets of users, in accordance with an embodiment of the invention. The machine learning module 345 determines 610 subsets of users of the social networking system 100 so as to generate machine learning models for each subset. The subsets may be determined based on demographic information of the users. For example, subsets of users may comprise users belonging to a particular ethnic group, users belonging to a particular age group, user having a particular range of income, a particular gender, or users that speak a particular language. A subset may be determined based on multiple demographic attributes, for example, female users belonging to a particular age group that earn more than a threshold income.

The machine learning module 345 generates 620 a machine learning model 125 for ranking news feed stories corresponding to each subset of users. The generation 620 of the news feed ranking model 125 may comprise training the news feed ranking model 125 based on a training data set. The training data set may be provided by an expert. An expert may analyze various features of the news feed stories 180 and determines data corresponding to values of the feature. For example, if a feature specifies whether a comment posted by a user comprises a uniform resource locator (URL) link or not, the training data set comprises sets of news feed stories describing comments with URLs and sets of news feed stories describing comments without URLs. Similarly, if the feature associated with a news feed story comprises age of the news feed stories, the training data set comprises news feed stories 180 with very small age value, news feed stories 180 with very large age values and also news feed stories 180 with average age values. Furthermore, for each type of feature, the training data store comprises examples of users that were interested in the stories with that feature and users that were not interested in that feature.

The machine learning module 345 periodically retrains 630 the model corresponding to each subset of users of the social networking system. The machine learning module 345 may retrain each model at a fixed frequency. The model corresponding to each subset may be retrained 630 at a different frequency compared to other models. The machine learning module 345 may use information describing how users of each subset interact with the news feed stories ranked by a model are presented to them to determine a rate at which the corresponding model is retrained 630.

Figure 7:
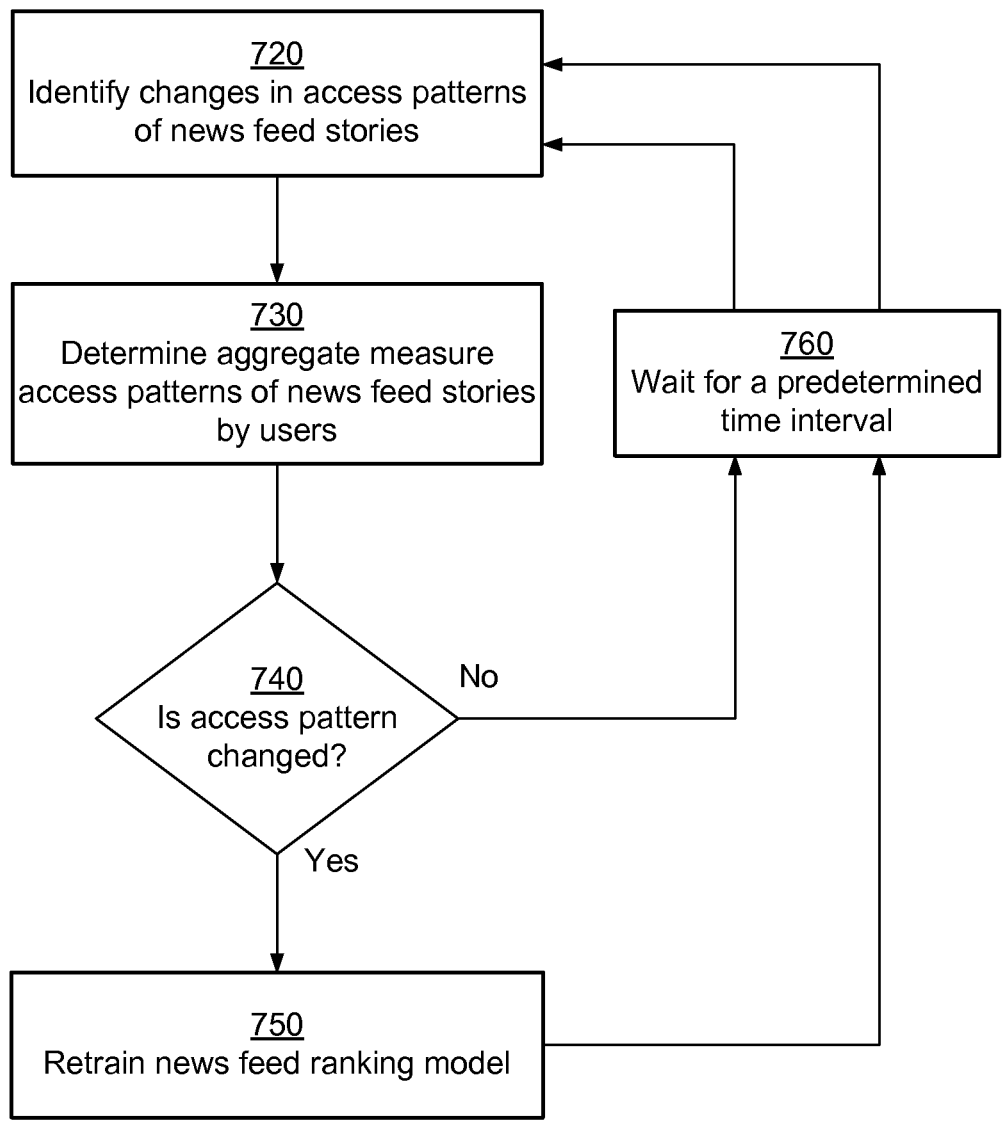
FIG. 7 is a flowchart of the process of periodically retraining a model for ranking news feed stories for a set of users of the social networking system, in accordance with one embodiment of the invention.

FIG. 7 is a flowchart of the process of periodically retraining a model for ranking news feed stories for a set of users of the social networking system, in accordance with one embodiment of the invention. The machine learning module 345 retrains the model 125 based on changes in access patterns of news feed stories 180 by the users. The news feed access analyzer 315 identifies 720 changes in access patterns of news feed stories by the users presented with the stories. The change in the access patterns of the news feed stories 180 can be caused by various factors. There may be an overall change in the demographics of the users, for example, the percentage of population with particular demographic characteristics that is member of the social networking system 100 may have increased. For example, the newer population comprising more percentage of younger people may be more interested in reading news feed stories with images compared to previous population. Alternatively a subset of population may change over time resulting in different access patterns. Similarly, there may be a system upgrade by the social networking system 100 that may cause changed in access patterns of new feed stories. For example, the social networking system 100 may have added new features that improve the presentation of videos, thereby resulting in users to being more interested in news feed stories 180 related to videos. Alternatively, there may be a change in technology that is external to the social networking system 100 that results in changes in access patterns of news feed stories. For example, a change in smart phone technology may improve the way videos are presented via smart phones, thereby causing smart phone users to access more news feed stories associated with videos.

The news feed access analyzer 315 determines 730 an aggregate measure of access rate of news feed stories by the users. For example, the news feed access analyzer 315 may determine number of news feed stories with particular characteristics that are read in a given interval of time. In an embodiment, the aggregate measure may weigh different types of actions by users differently. In an embodiment, news feed access analyzer 315 gives higher weight to actions that are stronger indications that a user is interested in a story compared to other actions. For example, an action comprising a user liking a story may be given higher weight compared to a user retrieving more information about the story. For a given type of news feed stories, the news feed access analyzer 315 monitors changes in access rates for different demographic groups of users. In an embodiment, the news feed access analyzer 315 determines an expected value of rate of access of news feed stories by a set of users. If the news feed access analyzer 315 determines 740 that the difference between measured value of rate of access of news feed stories by the set of users and the expected value is more than a threshold value, the news feed access analyzer 315 indicates to the machine learning module 345 to retrain 750 the news feed ranking model 125. In another embodiment, the news feed access analyzer 315 monitors the aggregate measure of rate of access of news feed stories by users over subsequent intervals of time. If the change in the aggregate measure over successive intervals of time exceeds a threshold value, the news feed access analyzer 315 indicates to the machine learning module 345 to retrain 750 the news feed ranking model 125.

Alternative Applications

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A computer-implemented method comprising:
receiving information describing interactions of users of a social networking system with a plurality of news feed stories maintained by the social networking system;
identifying one or more news feed stories from the plurality of news feed stories for presentation to a viewer;
for each of the one or more identified news feed stories, identifying a first set of features describing interactions of other users of the social networking system with whom the viewer has previously established a connection, the features from the first set comprising a first aggregate measure based on interactions of the other users, wherein the interactions of the other users are with objects described in the news feed story, the first aggregate measure weighing interactions of the other users based on their affinity with the viewer;
training a first news feed ranking model using the first set of features, the first news feed ranking model configured to rank candidate news feed stories selected for presentation to the viewer;
for each of the one or more identified news feed stories, identifying a second set of features describing interactions of the viewer, the features from the second set comprising a second aggregate measure based on interactions of the viewer, wherein the interactions of the viewer are with objects described in the news feed story;
training a second news feed ranking model using the second set of features, the second news feed ranking model configured to rank candidate news feed stories selected for presentation to the viewer; and
determining whether to use the first news feed ranking model or the second news feed ranking model to rank candidate news feed stories selected for presentation to the viewer based on a number of interactions of the viewer with the objects described in the news feed story being below a predetermined threshold.

2. The computer-implemented method of claim 1, wherein the first set of features further describe interactions of the other users with other news feed stories similar to the news feed story.

3. The computer-implemented method of claim 1, wherein the second set of features further describe interactions of the viewer with other news feed stories similar to the news feed story.

4. The computer-implemented method of claim 1, wherein the first set of features further describes demographic information of the other users.

5. The computer-implemented method of claim 1, wherein the interactions of the users of the social networking system comprise positive interactions of the users with a first set of news feed stories of the plurality of news feed stories and negative interactions of the users with a second set of news feed stories of the plurality of news feed stories, the positive interactions indicative of user interest in the first set of news feed stories, and the negative interactions indicative of lack of user interest in the second set of news feed stories.

6. The computer-implemented method of claim 5, wherein at least one of the positive interactions is retrieving additional information describing one of the news feed stories of the first set, recommending one of the news feed stories of the first set, liking one of the news feed stories of the first set, commenting on one of the new feed stories of the first set, or selecting a link from one of the news feed stories of the first set.

7. The computer-implemented method of claim 5, wherein at least one of the negative interactions is deleting one of the news feed stories of the second set from a profile page of one of the users of the social networking system, hiding one of the news feed stories of the second set, or ignoring one of the news feed stories of the second set.

8. The computer-implemented method of claim 1, wherein the received information further describes interactions of the users of the social networking system with one or more objects, each of the one or more objects associated with at least one of the news feed stories, and wherein for a particular news feed story, the first set of features and the second set of features are based at least in part on an object representing an entity described in the particular news feed story.

9. A computer-implemented method comprising:
selecting a set of candidate news feed stories maintained by a social networking system for presentation to a viewer, each candidate news feed story describing an interaction of a user with one or more objects;
for each candidate news feed story, identifying a first set of features describing interactions of other users of the social networking system with whom the viewer has previously established a connection, the features from the first set comprising a first aggregate measure based on interactions of the other users with objects described in the candidate news feed story, the first aggregate measure weighing interactions of the other users based on their affinity with the viewer;
providing the first set of features as input to a first news feed ranking model trained to rank news feed stories for presentation to the viewer;
for each candidate news feed story, identifying a second set of features describing interactions of the viewer, the features from the second set comprising a second aggregate measure based on interactions of the viewer, wherein the interactions of the viewer are with objects described in the candidate news feed story;
providing the second set of features as input to a second news feed ranking model trained to rank news feed stories for presentation to the viewer; and
determining whether to use the first news feed ranking model or the second news feed ranking model to rank the set of candidate news feed stories based on a number of interactions of the viewer with objects described in the candidate news feed story being below a predetermined threshold.

10. The computer-implemented method of claim 9, wherein the first set of features further describe interactions of the other users with other news feed stories similar to the news feed story.

11. The computer-implemented method of claim 9, wherein the second set of features further describe interactions of the viewer with other news feed stories similar to the news feed story.

12. The computer-implemented method of claim 9, wherein the first set of features describes demographic information of the other users.

13. The computer-implemented method of claim 9, wherein the interactions of the other users comprise at least one of retrieving additional information describing a candidate news feed story, recommending a candidate news feed story, liking a candidate news feed story, commenting on a candidate news feed story, selecting a link from a candidate news feed story, deleting a candidate news feed story from a profile page of a user of the social networking system, hiding a candidate news feed story, or ignoring a candidate news feed story.

14. The computer-implemented method of claim 9, wherein the interactions of the other users of the social networking system comprise positive interactions of the users with a first set of news feed stories of the plurality of news feed stories and negative interactions of the users with a second set of news feed stories of the plurality of news feed stories, the positive interactions indicative of user interest in the first set of news feed stories, and the negative interactions indicative of lack of user interest in the second set of news feed stories.

15. The computer-implemented method of claim 14, wherein at least one of the positive interactions is retrieving additional information describing one of the news feed stories of the first set, recommending one of the news feed stories of the first set, liking one of the news feed stories of the first set, commenting on one of the new feed stories of the first set, or selecting a link from one of the news feed stories of the first set.

16. The computer-implemented method of claim 14, wherein at least one of the negative interactions is deleting one of the news feed stories of the second set from a profile page of one of the users of the social networking system, hiding one of the news feed stories of the second set, or ignoring one of the news feed stories of the second set.

17. A computer-implemented method comprising:
receiving information describing interactions of users of a social networking system with a plurality of news feed stories maintained by the social networking system;
identifying one or more news feed stories from the plurality of news feed stories for presentation to a viewer;
determining whether a number of past interactions performed on the social networking system by the viewer is below a threshold;
ranking the one or more news feed stories for the viewer based on a first news feed ranking model if the number of past interactions of the viewer is determined to be below the threshold, the first news feed ranking model configured to rank candidate news feed stories selected for presentation to the viewer, the ranking comprising:
for each of the one or more identified news feed stories,
identifying a first set of features describing interactions of other users of the social networking system with whom the viewer has previously established a connection, the features from the first set comprising a first aggregate measure based on interactions of the other users, wherein the interactions of the other users are with objects described in the news feed story, the first aggregate measure weighing interactions of the other users based on their affinity with the viewer;
training the first news feed ranking model using the first set of features; and
using the first model to rank the one or more news feed stories; and
ranking the one or more news feed stories for the viewer based on a second news feed ranking model if the number of past interactions of the viewer is determined to be above the threshold, the second news feed ranking model configured to rank candidate news feed stories selected for presentation to the viewer, the ranking comprising:
for each of the one or more identified news feed stories,
identifying a second set of features describing interactions of the viewer, the features from the second set comprising a second aggregate measure based on interactions of the viewer, wherein the interactions of the viewer are with objects described in the news feed story;
training the second news feed ranking model using the second set of features; and
using the second model to rank the one or more news feed stories.

18. The computer-implemented method of claim 17, wherein the received information further describes interactions of the users of the social networking system with one or more objects, each of the one or more objects associated with at least one of the news feed stories, and wherein for a particular news feed story, the first set of features and the second set of features are based at least in part on an object representing an entity described in the particular news feed story.

19. The computer-implemented method of claim 18, wherein the interactions of the users of the social networking system comprise positive interactions of the users with a first set of news feed stories of the plurality of news feed stories and negative interactions of the users with a second set of news feed stories of the plurality of news feed stories, the positive interactions indicative of user interest in the first set of news feed stories, and the negative interactions indicative of lack of user interest in the second set of news feed stories.

20. The computer-implemented method of claim 17, wherein the second set of features further describe interactions of the viewer with other news feed stories similar to the news feed story.

21. A non-transitory computer-readable storage medium storing instructions for:
receiving information describing interactions of users of a social networking system with a plurality of news feed stories maintained by the social networking system;
identifying one or more news feed stories from the plurality of news feed stories for presentation to a viewer;
for each of the one or more identified news feed stories,
identifying a first set of features describing interactions of other users of the social networking system with whom the viewer has previously established a connection, the features from the first set comprising a first aggregate measure based on interactions of the other users, wherein the interactions of the other users are with objects described in the news feed story, the first aggregate measure weighing interactions of the other users based on their affinity with the viewer;
training a first news feed ranking model using the first set of features, the first news feed ranking model configured to rank candidate news feed stories selected for presentation to the viewer;
for each of the one or more identified news feed stories,
identifying a second set of features describing interactions of the viewer, the features from the second set comprising a second aggregate measure based on interactions of the viewer, wherein the interactions of the viewer are with the objects described in the news feed story;
training a second news feed ranking model using the second set of features, the second news feed ranking model configured to rank candidate news feed stories selected for presentation to the viewer; and
determining whether to use the first news feed ranking model or the second news feed ranking model to rank candidate news feed stories selected for presentation to the viewer based on a number of interactions of the viewer with the objects described in the news feed story being below a predetermined threshold.

22. The non-transitory computer-readable storage medium of claim 21, wherein the interactions of the users of the social networking system comprise positive interactions of the users with a first set of news feed stories of the plurality of news feed stories and negative interactions of the users with a second set of news feed stories of the plurality of news feed stories, the positive interactions indicative of user interest in the first set of news feed stories, and the negative interactions indicative of lack of user interest in the second set of news feed stories.

23. The non-transitory computer-readable storage medium of claim 22, wherein at least one of the positive interactions is retrieving additional information describing one of the news feed stories of the first set, recommending one of the news feed stories of the first set, liking one of the news feed stories of the first set, commenting on one of the new feed stories of the first set, or selecting a link from one of the news feed stories of the first set.

24. The non-transitory computer-readable storage medium of claim 22, wherein at least one of the negative interactions is deleting one of the news feed stories of the second set from a profile page of one of the users of the social networking system, hiding one of the news feed stories of the second set, or ignoring one of the news feed stories of the second set.

* * * * *